(12) United States Patent
Morikawa et al.

(10) Patent No.: US 9,649,602 B2
(45) Date of Patent: May 16, 2017

(54) METHOD OF SEWAGE TREATMENT AND SEWAGE TREATMENT APPARATUS

(75) Inventors: Hirofumi Morikawa, Kusatsu (JP); Shuji Furuno, Kyoto (JP); Masahiro Henmi, Otsu (JP)

(73) Assignee: Toray Industries, Inc., Tokyo (JP)

( * ) Notice: Subject to any disclaimer, the term of this patent is extended or adjusted under 35 U.S.C. 154(b) by 1248 days.

(21) Appl. No.: 11/979,277

(22) Filed: Oct. 31, 2007

(65) Prior Publication Data
US 2008/0067127 A1 Mar. 20, 2008

Related U.S. Application Data

(62) Division of application No. 10/312,696, filed as application No. PCT/JP02/00921 on Feb. 5, 2002, now abandoned.

(30) Foreign Application Priority Data

Feb. 16, 2001 (JP) .................................. 2001-39927
Sep. 12, 2001 (JP) ................................ 2001-276224

(51) Int. Cl.
*C02F 1/44* (2006.01)
*B01D 61/18* (2006.01)
(Continued)

(52) U.S. Cl.
CPC ............. *B01D 71/34* (2013.01); *B01D 61/18* (2013.01); *B01D 63/081* (2013.01);
(Continued)

(58) Field of Classification Search
USPC .............. 210/500.42, 490, 650, 652, 321.75, 210/321.84, 314, 346, 486; 156/242,
(Continued)

(56) References Cited

U.S. PATENT DOCUMENTS 4,399,035 A 8/1983 Nohmi et al. ............. 210/500.2
4,806,291 A 2/1989 Susa ............................... 264/41
(Continued)

FOREIGN PATENT DOCUMENTS

JP 57-035906 A 2/1982
JP 61-71802 A 4/1986
(Continued)

OTHER PUBLICATIONS

Stengaard, F.F., "Preparation of Asymmetric Microfiltration Membranes and Modification of Their Properties by Chemical Treatment", *Journal of Membrane Science*, 36, 1988, pp. 257-275.
(Continued)

*Primary Examiner* — Krishnan S Menon
(74) *Attorney, Agent, or Firm* — Kubovcik & Kubovcik

(57) ABSTRACT

A method of sewage treatment includes:
immersing a separation membrane module into sewage, wherein the separation membrane module has a plurality of separation membrane elements, each having a supporting plate, a separation membrane and a filtered water outlet;
separating water into filtered water and suspended solids by having the water permeated through the separation membrane; and
having the filtered water flow toward the exterior from the filtered water outlet;
wherein the separation membrane has a nonwoven fabric and a porous resin layer on at least one surface of the nonwoven fabric; and
a part of the resin permeates into the nonwoven fabric to form a composite layer with the nonwoven fabric.

6 Claims, 13 Drawing Sheets

(51) Int. Cl.
  *B01D 63/08* (2006.01)
  *B01D 71/34* (2006.01)
  *B01D 63/10* (2006.01)
  *B01D 65/08* (2006.01)
  *B01D 67/00* (2006.01)
  *B01D 69/02* (2006.01)
  *B01D 69/10* (2006.01)
  *B01D 69/12* (2006.01)

(52) U.S. Cl.
  CPC ........ *B01D 63/082* (2013.01); *B01D 63/10* (2013.01); *B01D 65/08* (2013.01); *B01D 67/003* (2013.01); *B01D 67/0011* (2013.01); *B01D 67/0016* (2013.01); *B01D 69/02* (2013.01); *B01D 69/10* (2013.01); *B01D 69/12* (2013.01); *B01D 2315/06* (2013.01); *B01D 2321/185* (2013.01); *B01D 2323/08* (2013.01); *B01D 2323/12* (2013.01); *B01D 2325/04* (2013.01); *C02F 1/444* (2013.01)

(58) Field of Classification Search
  USPC ................................................ 156/244.24
  See application file for complete search history.

(56) References Cited

U.S. PATENT DOCUMENTS

| 5,275,725 | A | 1/1994 | Ishii et al. ............... 210/321.67 |
| 5,376,273 | A | 12/1994 | Pacheco et al. ............ 210/490 |
| 5,834,107 | A | 11/1998 | Wang et al. ............... 428/310.5 |
| 6,024,872 | A | 2/2000 | Mahendran et al. .... 210/500.25 |
| 6,325,938 | B1* | 12/2001 | Miyashita et al. ............ 210/636 |
| 6,495,041 | B2* | 12/2002 | Taniguchi et al. ....... 210/321.89 |

FOREIGN PATENT DOCUMENTS

| JP | 04-247288 A | 9/1992 |
| JP | 10-225626 A | 8/1998 |
| JP | 2000-176255 A | 6/2000 |
| JP | 2000-279768 A | 10/2000 |
| WO | 00/78437 A1 | 12/2000 |

OTHER PUBLICATIONS

IPCS INCHEM: Polyvinylpyrrolidone (PVP), printed from the internet on Nov. 3, 2005, http:www.inchem.org/documents/jecfa/jecmono/v15je08.htm.
Naoshi et al., "The Membrane Society of Japan Membrane Science Experimental Series", vol. III: Artificial Membranes, Kyoritsu Shuppan Co., Ltd., 1993.
IPCS INCHEM: Polyvinylpyrrolidone (PVP), printed from the internet on Nov. 3, 2005 http://www.inchem.org/documents/jecfa/jecmono/v15je08.htm.
Naoshi, et al., "The Membrane Society of Japan Membrane Science Experimental Series", vol. III: Artificial Membranes, Kyoritsu Shuppan Co., Ltd., 1993.
Journal of Membrane Science, 81 (1993), pp. 173-190.
English translation of JP 10-225626A (published Aug. 25, 1998).

* cited by examiner

1 μm

1 μm

10 μm

10 μm

METHOD OF SEWAGE TREATMENT AND SEWAGE TREATMENT APPARATUS

This application is a division of U.S. patent application Ser. No. 10/312,696, now abandoned, which is a 371 of PCT/JP02/00921 filed Feb. 5, 2002, which claims priority of Japanese Patent Application Nos. 2001-39927 and 2001-276224 filed February 16 and Sep. 12, 2001, respectively, each of which is incorporated herein by reference.

BACKGROUND OF THE INVENTION

Field of the Invention

The present invention relates to a separation membrane suitably used in purification of sewage, namely, domestic wastewater exhausted from life environments such as cooking, washing, taking a bath, and relieving nature, and of wastewater discharged from manufacturing plants, restaurants, fish processing factories, and food processing factories. The present invention also relates to a method for making the separation membrane. Moreover, the present invention relates to a separation membrane element, a separation membrane module, and a sewage treatment apparatus including the separation membrane.

Description of the Related Art

Separation membranes have recently been used for purification of sewage and wastewater. Though various types and shapes of separation membranes are known, a flat membrane called a microfiltration membrane attracts attention. The microfiltration membrane is generally formed as follows. A resin solution containing a pore-forming agent is applied onto a surface of a porous substrate such as woven or nonwoven fabric or is impregnated into the porous substrate, and the resin is coagulated to form a porous resin layer on the porous substrate. The porous resin layer functions as a separation layer. Unfortunately, the flat membrane does not have a large effective area per unit area, compared with other types of separation membranes, for example, a hollow fiber membrane; hence, the flat membrane is required to achieve high water permeability while maintaining a micropore size corresponding to the object to be filtered. When the porosity is increased in order to achieve high water permeability, the micropore size excessively increases or surface cracks causing a decrease in rejection occur. When the micropore size is decreased in order to achieve a high rejection, the water permeability inevitably decreases. Accordingly, a high rejection and high water permeability are basically incompatible. It is difficult to achieve balanced compatibility therebetween.

In addition, separation membranes for sewage water undergo heavy collision of solid materials such as sand and sludge in use and heavy collision of bubbles during an aeration process which is performed to supply oxygen into activated sludge and to prevent clogging. Thus, the separation membrane must have sufficiently high strength durable to such severe impacts. Such high strength is primarily borne by the porous substrate. In any known separation membrane, the porous resin layer would be separated from the porous substrate during a filtration process and an aeration process in severe cases.

SUMMARY OF THE INVENTION

An object of the present invention is to provide a separation membrane which does not exhibit the above problems, has high water permeability, and does not cause separation of a porous resin layer from a porous substrate. Another object of the present invention is to provide a method for simply making the separation membrane.

According to an aspect of the present invention, a separation membrane comprises a porous substrate and a porous resin layer on at least one surface of the porous substrate, the porous resin layer comprising a resin, part of the resin permeating into the porous substrate to form a composite layer with the porous substrate, wherein at least one of the following relationships (1) and (2) is satisfied: (1) the porous resin layer has an average pore size in the range of 0.01 to 0.2 μm and a standard variation of the pore size of 0.1 μm or less at the surface; and (2) the porous resin layer has macrovoids having short diameters of 0.05×A or more wherein A represents the thickness of the porous substrate, and the rejection of micro particles having an average particle size of 0.9 μm is at least 90%.

The average pore size and the standard deviation are determined based on diameters of all micropores which can be observed in a scope of 9.2 μm by 10.4 μm by scanning electron microscopy at a magnification of ×10,000.

According to another aspect of the present invention, a method for making a separation membrane comprises the steps of applying a solvent containing a resin, a pore-forming agent, and a solvent onto at least one surface of a porous substrate having a density of 0.7 g/cm$^3$ or less to form a coating film and to impregnate the porous substrate with the solvent; and immersing the porous substrate into a coagulation bath containing a non-solvent to coagulate the resin and to form a porous resin layer on the surface of the porous substrate.

Furthermore, the present invention is directed to a separation membrane element including the separation membrane, a separation membrane module including the separation membrane elements, and a sewage treatment apparatus including the separation membrane module.

DESCRIPTION OF THE PREFERRED EMBODIMENTS

Figure 1:
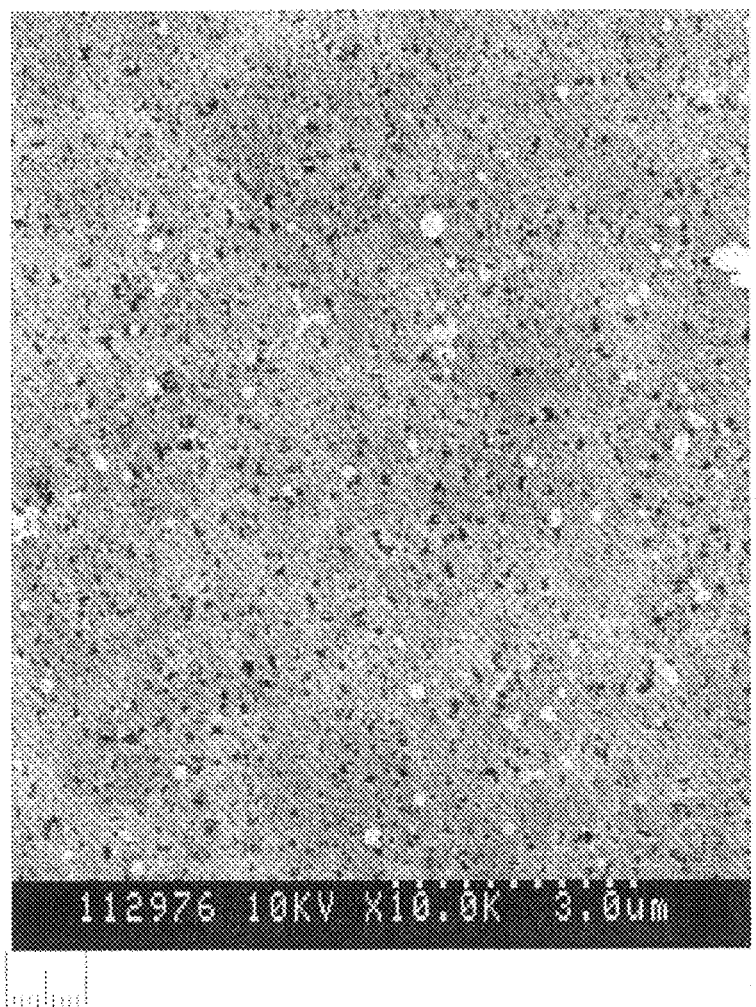
FIG. 1 is a scanning electron micrograph of a surface of a separation membrane according to EXAMPLE 1 of the present invention.

The separation membrane according to the present invention comprises a porous substrate and a porous resin layer, which functions as a separation layer, on at least one surface of the porous substrate. The porous resin layer comprises a resin and part of the resin permeates into the porous substrate to form a composite layer with the porous substrate. In the present invention, the porous resin layer does not include the composite layer.

The porous substrate supports the porous resin layer and imparts strength to the separation membrane. Both organic materials and inorganic materials can be used as the porous substrate, and organic fibers are preferably used since they are lightweight. More preferable porous substrates are woven or nonwoven fabrics of organic fibers such as cellulose fibers, cellulose triacetate fibers, polyester fibers, polypropylene fibers, and polyethylene fibers. In particular, nonwoven fabrics are preferable because the control of density is easy and the nonwoven fabrics can be readily produced with reduced costs.

A significantly thin porous substrate does not have a sufficient strength for use in the separation membrane, and a significantly thick porous substrate causes a decrease in water permeability. Thus, the thickness of the porous substrate is preferably in the range of 50 μm to 1 mm, and more preferably 70 μm to 500 μm.

As described above, the porous resin layer functions as a separation layer. Examples of materials used for the porous resin layer include polyethylene resins, polypropylene resins, polyvinyl chloride resins, polyvinylidene fluoride resins, polysulfone resins, polyethersulfone resins, polyimide resins, and polyether imide resins. These resins may contain other resins, as long as these resins are primary components. Herein, the "primary components" means that at least 50% and preferably at least 60% of the above resin is contained. Among these resins preferable are polyvinyl chloride resins, polyvinylidene fluoride resins, polysulfone resins, and polyethersulfone resins since films can be readily formed from these resins by a solution process and these resins exhibit high mechanical and chemical resistances. The most preferable resins are polyvinylidene fluoride and mixtures containing polyvinylidene fluoride as the primary component.

The thickness of the porous resin layer is preferably in the range of 1 μm to 500 μm and more preferably in the range of 5 μm to 200 μm. A significantly thin porous resin causes exposing of the porous substrate, resulting in adhesion of contaminants to the porous substrate. In such a case, the filtration pressure will increase and the filtering performance may not be restored sufficiently after washing. A significantly thick porous resin layer may cause a decrease in water permeability.

Part of the resin of the porous resin layer permeates into at least the surface layer of the porous substrate to form a composite layer with the porous substrate at least at the surface layer. The resin permeating into the porous substrate is firmly fixed on the porous substrate by the so-called "anchor effect" and is not detached from the porous substrate. The porous resin layer may be formed on one surface of the porous substrate or porous resin layers may be formed on both surfaces thereof. If the porous resin layer is provided on one surface, a separation membrane with high water permeability can be readily formed. If the porous resin layers are provided on two surfaces, the separation membrane can maintain high performance in use for a long time. If the porous resin layers are provided on both surfaces, the porous resin layers may be symmetrical or asymmetrical to the porous substrate. Also if the porous resin layers are provided on both surfaces, the both porous resin layers may be continuous through the composite layer or may be discontinuous.

The separation membrane according to the present invention has an average pore size in the range of 0.01 μm to 0.2 μm and a standard deviation of pore size of 0.1 μm or less at the surface of the porous resin layer. The separation membrane satisfying such ranges exhibits both a high permeability for a long time without clogging and a high rejection, which means that fungus and sludge do not leak. A smaller average pore size may cause decreased water permeability. Thus, the average pore size is preferably at least 0.02 μm and more preferably at least 0.04 μm. If the porous resin layers are provided on two surfaces of the porous substrate, at least one of the porous resin layers must satisfy the above conditions.

The average pore size and the standard deviation are determined based on diameters of all micropores which can be observed in a scope of 9.2 μm by 10.4 μm by scanning electron microscopy at a magnification of ×10,000.

It is not clear why the above range on the pore size distribution is preferable, but is supposed as follows. When the standard deviation of the pore sizes exceeds 0.1 μm, micropores on the surface of the porous resin layer have a broad pore size distribution. Since large micropores readily permeate water, the resulting separation membrane exhibits an increased permeability at an initial stage. Because water permeates preferentially through larger pores, foreign material preferentially clogs these larger pores during continuous sewage processing. As a result, only smaller micropores are still useful, steeply decreasing the water permeability of the separation membrane. When the standard deviation of the pore sizes is within the above range, such a disadvantageous phenomenon seems not to occur.

Preferably, the separation membrane according to the present invention satisfies the following inequalities:

$$B \geq 0.2 \times A, \text{ and}$$

$$C/B \geq 0.1$$

wherein A represents the thickness of the porous substrate, B represents the thickness of the porous resin layer, and C represents the thickness of the composite layer. If the thickness of the porous resin layer is smaller than 0.2×A, the strength is insufficient to the separation layer. If the ratio C/B is smaller than 0.1, the porous resin layer is readily detached from the porous substrate. On the contrary, if the ratio C/B is extraordinarily large, the water permeability will decrease. Thus, the ratio C/B generally satisfies the following relationship: $0.1 \leq C/B \leq 100$ and preferably $0.2 \leq C/B \leq 50$.

Preferably, the porous resin layer contains macrovoids having specific sizes. Herein, the "macrovoids" means pores which are present in the porous resin layer and have larger diameters than the pore diameter at the surface. The macrovoids are useful for maintaining the strength of the porous resin layer while improving the water permeability. Preferably, the macrovoids have short diameters of at least 0.05× A. A smaller short diameter causes a significant decrease in water permeability, though it increases the strength of the porous resin layer. On the other hand, an extraordinarily large short diameter causes decreased strength of the porous resin layer. Thus, the upper limit of sizes of the macrovoids is preferably 1×A or less.

The thickness of the porous resin layer, the thickness of the composite layer, and the sizes of the macrovoids in the porous resin layer can be determined by observing a cross-section perpendicular to the surface of the porous resin layer with a scanning electron microscope.

If the porous resin layers are provided on two surfaces the following inequalities are preferably satisfied:

$$2d_A \leq d_C$$

$$2d_B \leq d_C$$

wherein $d_A$ represents the average pore size at the surface of one of the porous resin layers, $d_B$ represents the average pore size at the surface of the other porous resin layer, and $d_C$ represents the average pore size in the central cross-section of the separation membrane in the thickness direction. Outside of the above range, the water permeability decreases due to an increase in permeation resistance.

In the separation membrane according to the present invention, the rejection of micro particles having an average particle size of 0.9 μm is preferably at least 90%. A rejection of less than 90% causes leakage of fungus and sludge, clogging due to fungus and sludge, an increased differential filtration pressure, and a significantly decreased life. Herein, the rejection is determined as follows. Using a stock dispersion containing purified water through a reverse osmosis membrane and 10 ppm of polystyrene latex microparticles having an average diameter of 0.9 μm (nominal diameter: 0.940 μm, the standard deviation: 0.0796 μm), the stock dispersion is allowed to permeate through the separation membrane at a head height of 1 m while the stock dispersion is stirred. The rejection is calculated by ultraviolet spectroscopy using the following equation:

Rejection={(absorbance of stock dispersion−absorbance of permeated dispersion)/absorbance of stock dispersion}×100 wherein the absorbance of the stock dispersion and the absorbance of the permeated dispersion are measured by using ultraviolet radiation at 240 nm.

The separation membrane according to the present invention may be combined with a support to prepare a separation membrane element.

In a preferred embodiment of the separation membrane element according to present invention, the separation membrane according to the present invention is arranged on at least one surface of a supporting plate as the support. This separation membrane element can be preferably used in sewage treatments as described below. However, it is difficult to increase the membrane area in this configuration; hence, the separation membranes are preferably arranged on both surfaces of the supporting plate to increase water permeability.

The configuration of the separation membrane element is not limited. Preferable configurations of the separation membrane element will now be described with reference to the drawings.

Referring to FIGS. 7 to 10, the element has a rigid supporting plate 1, and channel members 2 and separation membranes 3 arranged on both surfaces of the supporting plate 1 in that order. The supporting plate 1 has projections 4 and recesses 5. The contaminants in the liquid are removed by the separation membrane 3. The channel members 2 are provided so that water permeating through the separation membrane 3 effectively flows toward the supporting plate 1. The filtered water reaching the supporting plate 1 flows in the recesses of the supporting plate 1 toward the exterior.

Any supporting plate 1 may be used in the present invention as long as a plurality of projections and recesses are provided on both surfaces of the plate. Preferably, the recesses constitute a plurality of grooves arranged in parallel at a constant pitch so that the distance to the outlet for the filtered water and the channel resistance become uniform. In such a configuration, the filtered water uniformly flows along the membrane. The width of the recesses is preferably in the range of 1 mm to 20 mm and more preferably 1.5 mm to 5 mm to maintain high water permeability and to prevent sinking of the channel members 2 and the separation membranes 3 under severe aeration conditions. The depth of the recesses 5 is determined within the range of 1 mm to 10 mm to suppress the thickness of the element and to secure channels for the filtered water. Furthermore, the void fraction formed by the recesses of the supporting plate is preferably in the range of 15% to 85% to keep the strength of the supporting plate and to suppress the flow resistance of the filtered water. The void fraction means the volume fraction of voids formed by the recesses to a void fraction of a hollow rectangular parallelepiped of 100%. At a void fraction of less than 15%, the flow resistance is too high to effectively collect the filtered water. At a void fraction exceeding 85%, the strength of the supporting plate significantly decreases.

The supporting plate 1 is preferably composed of a rigid material having a tensile strength of about 15 MPa according to ASTM testing method D638. Examples of preferable materials are metals such as stainless steel; resins such as acrylonitrile-butadiene-styrene copolymers (ABS resins), polyethylene, polypropylene, and vinyl chloride; and composite materials such as fiber-reinforced plastics (RFP).

The channel member 2 preferably has a thickness in the range of 0.1 mm to 5 mm to decrease the thickness of the element while maintaining the flow channels. It is preferable that a material having a high porosity such as a plastic net be used to reduce pressure drop. The porosity of the channel member is preferably in the range of 40% to 96%.

Figure 8:
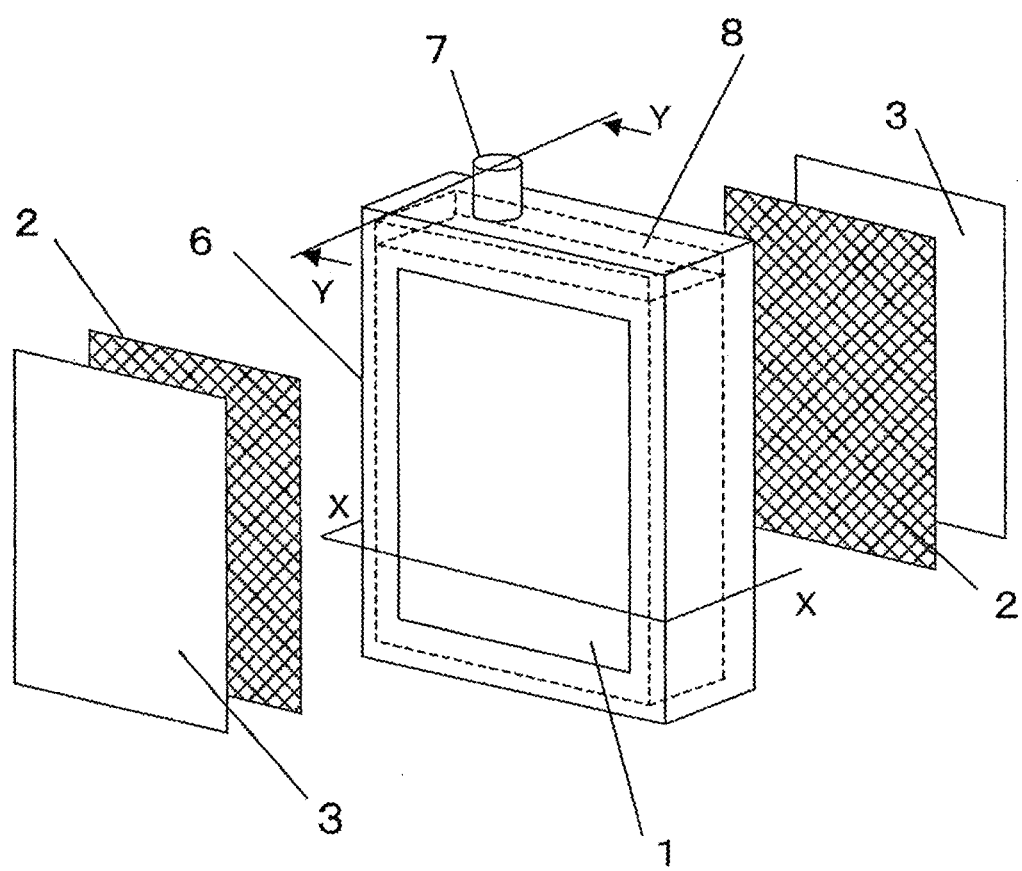
FIG. 8 is an exploded isometric view of an element including a separation membrane according to another embodiment of the present invention.

With reference to FIG. 8, the separation membrane element according to the present invention is preferably provided with a frame 6 at the periphery of the supporting plate 1. In that case, the separation membrane 3 may be disposed between the supporting plate 1 and the frame 6 or may be fixed onto the outer surface of the frame 6. The fixing process may be a bonding process using a resin, a welding process of the separation membrane itself, and any other bonding process. The frame 6, which is formed by injection molding or extrusion, may be engaged on the periphery of the supporting plate 1, which is formed by economical extrusion, to suppress fabrication costs. The frame 6 preferably has a U-shaped cross-section so that the supporting plate 1 can be readily engaged.

In the separation membrane element having such a configuration, the water permeating through the separation membrane 3 flows in the channel member 2 and the recesses 5 of the supporting plate 1 toward the exterior of the element through a filtered water outlet 7.

The separation membrane according to the present invention can be preferably used in sewage treatment apparatuses. The method for using the separation membrane is not limited. A preferable method for use will be described below.

Figure 11:
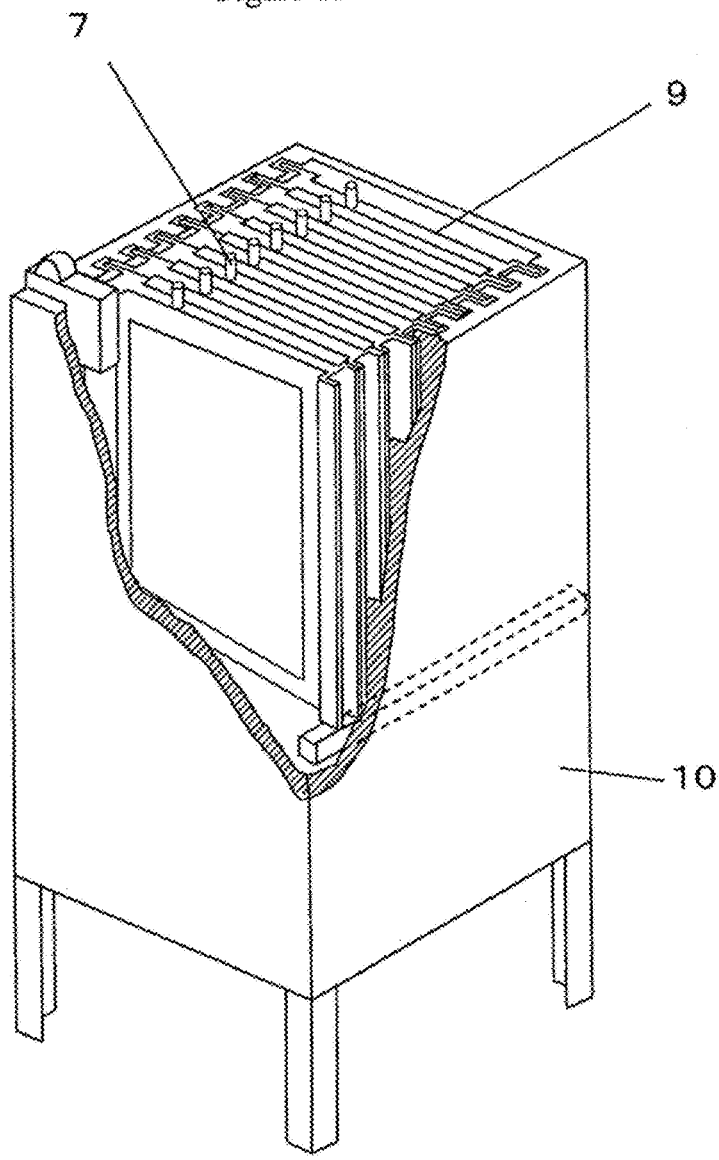
FIG. 11 is an isometric view of a module including a plurality of elements using the separation membranes and a housing for holding the elements according to the present invention.
Figure 12:
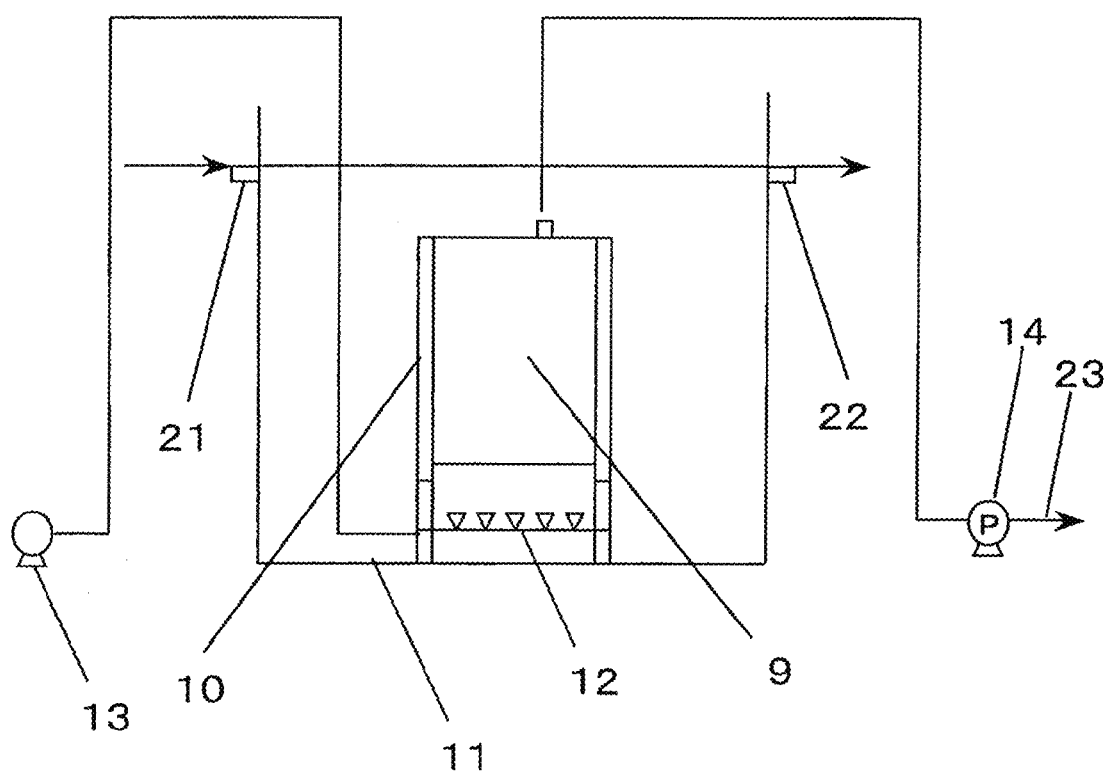
FIG. 12 is a flow chart illustrating a method for making water using the separation membrane according to the present invention.

Referring to FIG. 11, a plurality of the elements 9 are accommodated in parallel to each other in the housing so as to form a space between the surfaces of the separation membranes 3 (FIG. 7), in order to form the separation membrane module 10. This separation membrane module 10, as shown in FIG. 12, is used by immersing into water to be treated such as organic wastewater stored in a reservoir 11. Referring to FIG. 12, the separation membrane module 10 has a plurality of the elements 9 which are vertically arranged and an air diffuser 12 for supplying air from a blower 13 to the surfaces of the separation membranes therein, and has a pump 14, which sucks in filtered water, downstream of the separation membrane module 10.

In the sewage treatment apparatus having such a configuration, water to be treated, such as wastewater, is separated into water permeating through the separation membranes 3 by the suction force of the pump 14 and suspended solids such as microorganism particles and inorganic particles which do not permeate. The water permeating through the separation membranes 3 flows through a flow pathway formed of the channel member 2, the recesses 5 of supporting plate 1, a collecting conduit 8 formed in the frame 6, and the filtered water outlet 7 toward the exterior of the reservoir 11. During the filtration, the air diffuser 12 generates bubbles, which generate an upward flow parallel to the surfaces of the membranes of the elements 9 by the airlift effect. The upward flow removes the filtration residue deposited on the surfaces of the membranes.

Figure 13:
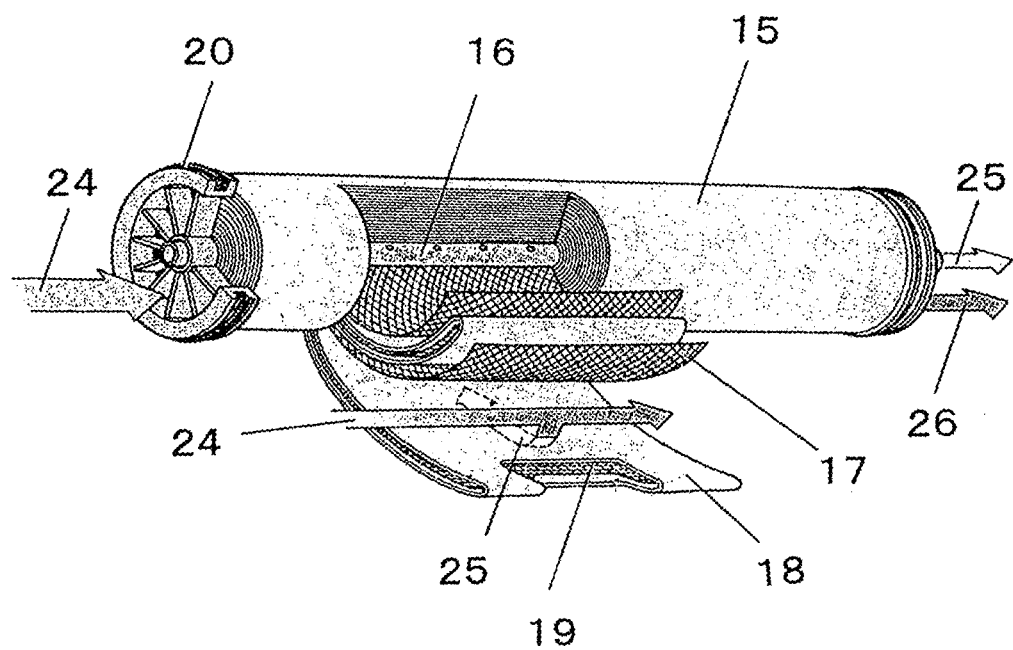
FIG. 13 is an isometric view of an element including a separation membrane according to another embodiment of the present invention.

Another preferable embodiment of the separation membrane element according to the present invention has a container and a spirally wound separation membrane according to the present invention accommodated in the container. The element in this embodiment will now be described with reference to FIG. 13.

A separation membrane element 15 includes folded separation membranes 18, each containing a mesh spacer 19. These separation membranes 18 are spirally wound around a central pipe 16 together with channel members 17. A brine seal 20 is provided at one end of the winding structure. In each element 15, supply water having a given pressure from the brine seal 20 flows through the mesh spacer 19 and permeates through the separation membrane 18. The filtered water is collected through the central pipe 16.

This element has a larger membrane area and thus has high water permeability compared with the above-described elements including the supporting plate. Since this element, however, exhibits relatively low supply effectively due to retention of contaminants at the supply side, this is suitable for treatment of seawater, brine, and river water. In case of use in treatment of sewage, preferably, the activated-sludge effluent is preliminarily treated by flocculation and precipitation, sand filtration, micro filtration membrane, or ultra filtration membrane. The preliminary treatments may be employed alone or in combination.

In general, the separation membrane according to the present invention may be produced by the following method.

A coating film is formed on a surface or surfaces of the above-described porous substrate with a solvent solution containing the above-described resin, a pore-forming agent, and a solvent, and the porous substrate is impregnated with the solvent. Then, the porous substrate is immersed into a coagulation bath containing a non-solvent to coagulate the resin and to form a porous resin layer(s) on the surface(s) of the porous substrate. Preferably, the solvent solution contains a non-solvent. The temperature of the solvent solution is preferably selected from the range of 15° C. to 120° C. in view of film formability.

The density of the porous substrate is preferably 0.7 g/cm$^3$ or less and more preferably 0.6 g/cm$^3$ or less. When the density of the porous substrate is within the range, the porous substrate can hold the resin forming the porous resin layer, so that an adequate composite layer or composite layers of the porous substrate and the resin is formed. Since a significantly low density causes a decrease in strength of the separation membrane, the density is preferably at least 0.3 g/cm$^3$. Herein, the density represents an apparent density, which can be determined from the area, the thickness, and the weight of the porous substrate.

The pore-forming agent is extracted from the resin layer to form pores in the resin layer when the porous substrate is immersed in the coagulation bath. Preferably, the pore-forming agent has high solubility in the coagulation bath. Examples of the pore-forming agents are inorganic salts such as calcium chloride and calcium carbonate. Alternatively, the pore-forming agents may be polyoxyalkylenes, e.g., polyethylene glycol and polypropylene glycol; and water-soluble polymers, e.g., polyvinyl alcohol, polyvinyl butyral, and polyacrylic acids; and glycerin. The pore-forming agent may be appropriately selected according to the resin. For example, for a resin primarily containing polyvinylidene fluoride, a polymer primarily containing polyethylene glycol is preferable. More preferably, a polymer primarily containing polyethylene glycol having a weight average molecular weight of at least 10,000 is used in view of balance among the surface pore size, pore size distribution, and permeability.

The solvent dissolves the resin. The solvent acts on the resin and the pore-forming agent and promotes the formation of the porous resin layer. Examples of solvents include N-methylpyrrolidone (NMP), N,N-dimethylacetamide (DMAc), N,N-dimethylformamide (DMF), dimethyl sulfoxide (DMSO), acetone, and methyl ethyl ketone. Among these preferably used are NMP, DMAc, DMF, and DMSO, which can highly dissolve the resin.

The non-solvent does not dissolve the resin. The non-solvent controls the coagulation rate of the resin and thus the size of the micropores and macrovoids. Examples of the non-solvents are water and alcohols such as methanol and ethanol. Among these, water and methanol are preferable in view of easy sewage treatment and economical advantages. The non-solvent may be a mixture thereof.

The solvent solution preferably contains 5 to 30 weight percent of resin, 0.1 to 15 weight percent of pore-forming agent, 40 to 94.9 weight percent of solvent, and 0 to 20 weight percent of non-solvent. A significantly low resin content may cause a decrease in strength of the porous resin layer, whereas a significantly high resin content may cause a decrease in water permeability. A significantly low pore-forming agent content may cause a decrease in water permeability, whereas a significantly high pore-forming agent content may cause a decrease in strength of the porous resin layer. When the pore-forming agent content is extremely high, the pore-forming agent remains in the porous resin layer and may dissolve in use, resulting in aggravation of water quality and fluctuation of water permeability. The pore-forming agent content in the solvent solution is more preferably in the range of 0.5 to 10 weight percent. At a significantly small volume of solvent, the solvent is readily gelated, whereas at a significantly large volume of solvent, the strength of the porous resin layer may decrease. The solvent content in the solvent solution is more preferably in the range of 60 to 90 weight percent.

Preferably, the solvent solution contains a non-solvent because the size of the micropores on the surface of the porous resin layer becomes uniform. Also, the size of the macrovoids is readily controlled. A significantly large non-solvent content, however, causes ready gelation of the solvent. Preferably, the solvent content in the solvent solution is in the range of 40 to 94.8 weight percent while the non-solvent content is in the range of 0.1 to 20 weight percent. More preferably, the solvent content is in the range of 40 to 94.4 weight percent while the non-solvent content is in the range of 0.5 to 15 weight percent.

The coagulation bath may contain a non-solvent or a mixture of a non-solvent and a solvent. In case of using a solvent solution containing a non-solvent, the non-solvent content in the coagulation bath is preferably at least 80 weight percent. A significantly small non-solvent content causes a delay of coagulation of the resin, resulting in an increase in micropore size and inhibiting the formation of the macrovoids. More preferably, the non-solvent content is in the range of 85 to 100 weight percent. When the solvent solution does not contain the non-solvent, the non-solvent content in the coagulation bath is preferably lower than that when the solvent solution contains the non-solvent. That is, the non-solvent content is preferably at least 60 weight percent. A large non-solvent content delays coagulation of the resin, resulting in the formation of the porous resin layer having a dense surface and containing internal macrovoids; however, a large non-solvent content may form fine cracks on the surface of the porous resin layer. The non-solvent content is more preferably in the range of 60 to 99 weight percent. The solvent content in the coagulation bath is adjusted to control the pore size on the surface of the porous resin layer and the size of the macrovoids. A significantly high bath temperature excessively promotes coagulation whereas a significantly low bath temperature excessively delays coagulation. Thus, the bath temperature is preferably in the range of 15° C. to 80° C. and more preferably 20° C. to 60° C.

A coating film from the solvent solution on the porous substrate may be formed by applying the solvent solution onto the porous substrate or immersing the porous substrate into the solvent solution. The solvent solution may be applied onto one surface or two surfaces of the porous substrate. The density of the porous substrate is preferably 0.7 g/cm$^3$ or less to achieve adequate impregnation of the porous substrate with the solvent solution, though the preferable density depends on the composition of the solvent solution.

EXAMPLES

Example 1

A polyvinylidene fluoride (PVDF) resin as a resin, polyethylene glycol (PEG) having a molecular weight of about 20,000 as a pore-forming agent, N,N-dimethylacetamide (DMAc) as a solvent, and pure water as a non-solvent were thoroughly mixed at 90° C. to prepare a solvent solution having the following composition.

| | |
|---|---|
| PVDF: | 13.0 weight percent |
| PEG: | 5.5 weight percent |

-continued

| | |
|---|---|
| DMAc: | 78.0 weight percent |
| Pure water: | 3.5 weight percent |

Figure 2:
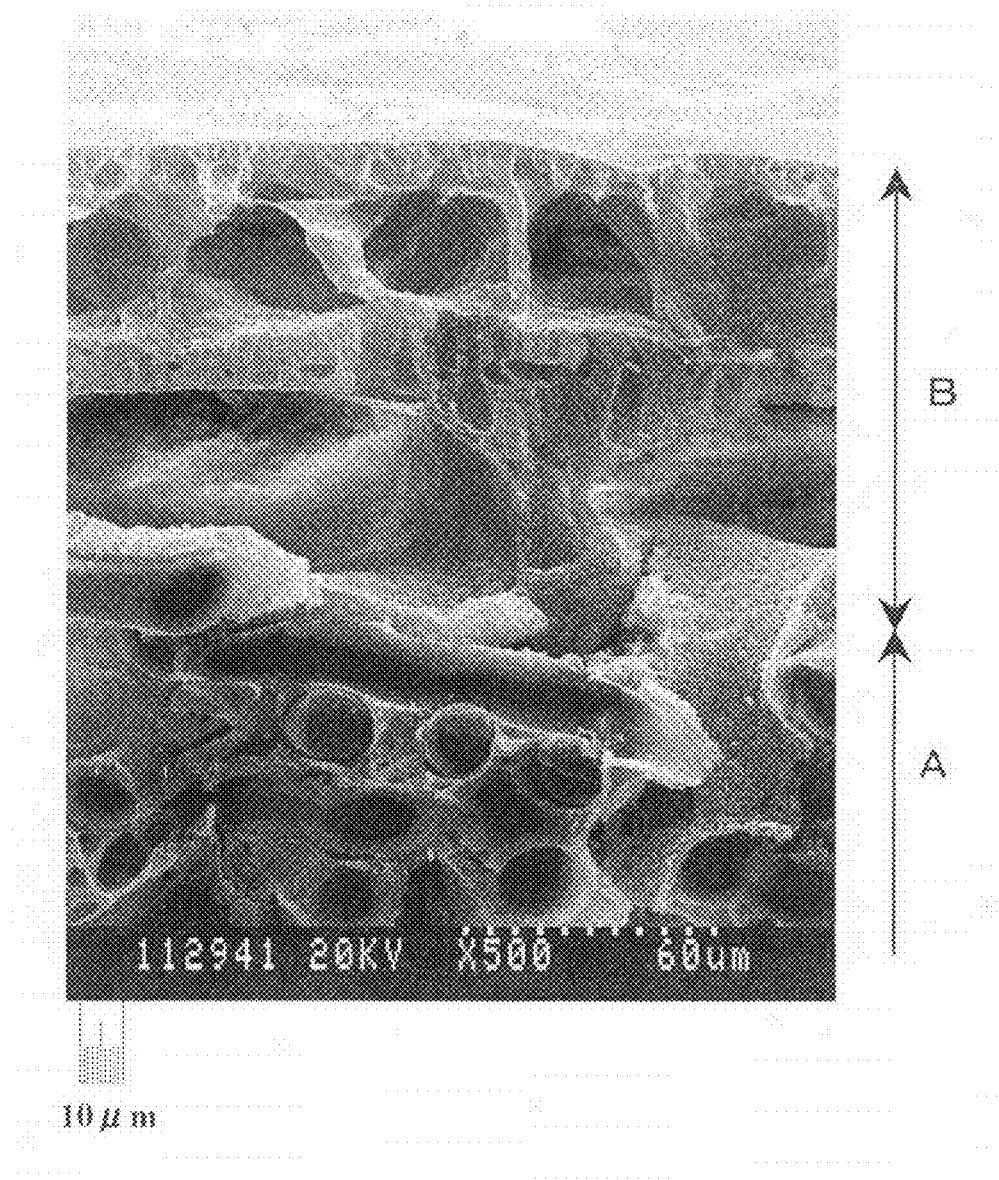
FIG. 2 is a scanning electron micrograph of a cross-section of the separation membrane according to EXAMPLE 1 of the present invention.

After the solvent solution was cooled to 25° C., this was applied onto a polyester nonwoven fabric having a density of 0.48 g/cm$^3$ and a thickness (A) of 220 μm and immediately immersed in pure water at 25° C. for 5 minutes. The nonwoven fabric was immersed in hot water at 80° C. three times to remove DMAc and PEG. A separation membrane shown in FIGS. 1 and 2 was thereby prepared. The porous resin layer and the composite layer were observed in the scope of 9.2 μm by 10.4 μm by scanning electron microscopy at a magnification of ×10,000. The average of sizes of all observable micropores was 0.067 μm and the standard deviation thereof was 0.033 μm. The cross-section perpendicular to the surface of the separation membrane was observed with the scanning electron microscope. Macrovoids having a short diameter of about 30 μm (about 0.14×A>0.05×A) were distributed in the porous resin layer and the composite layer. The thickness (B) of the porous resin layer was about 110 μm and the thickness (C) of the composite layer was about 220 μm, which was substantially equal to the thickness of the porous substrate. Thus, B was equal to about 0.5×A, which was larger than 0.2×A, and C/B was equal to about 2, which was larger than 0.1.

Using the separation membrane, the rejection for fine particles having an average diameter of 0.9 μm was measured. The rejection was 98%. The volume of permeating water was measured with a reverse osmosis membrane at a head height of 1 m using purified water at 25° C. The volume of the permeating water was 37×10$^{-9}$ m$^3$/m$^2$·Pa.

Figure 9:
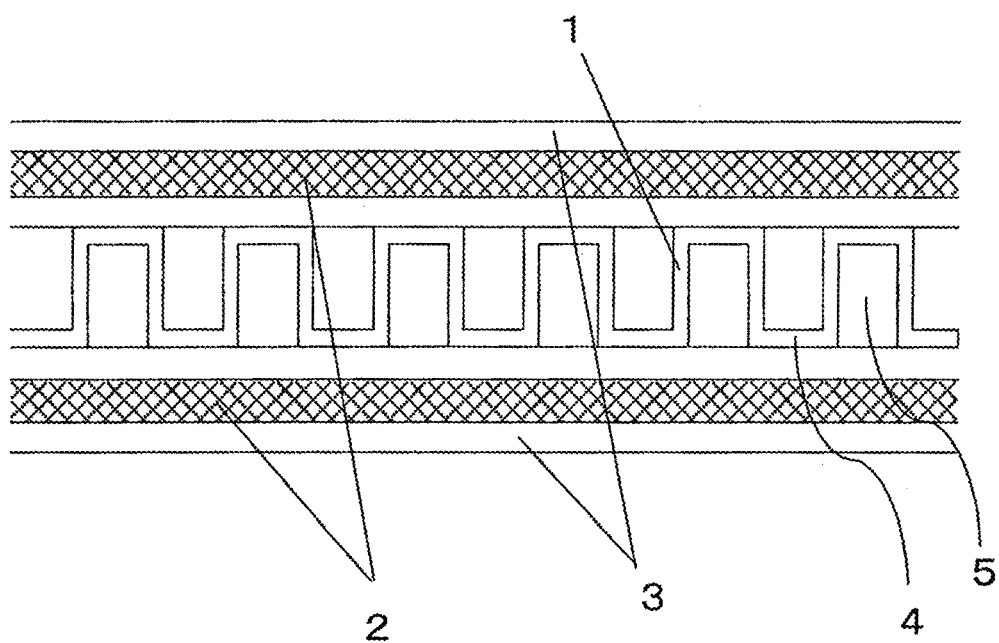
FIG. 9 is a partial transverse cross-sectional view of the element shown in FIG. 8.
Figure 10:
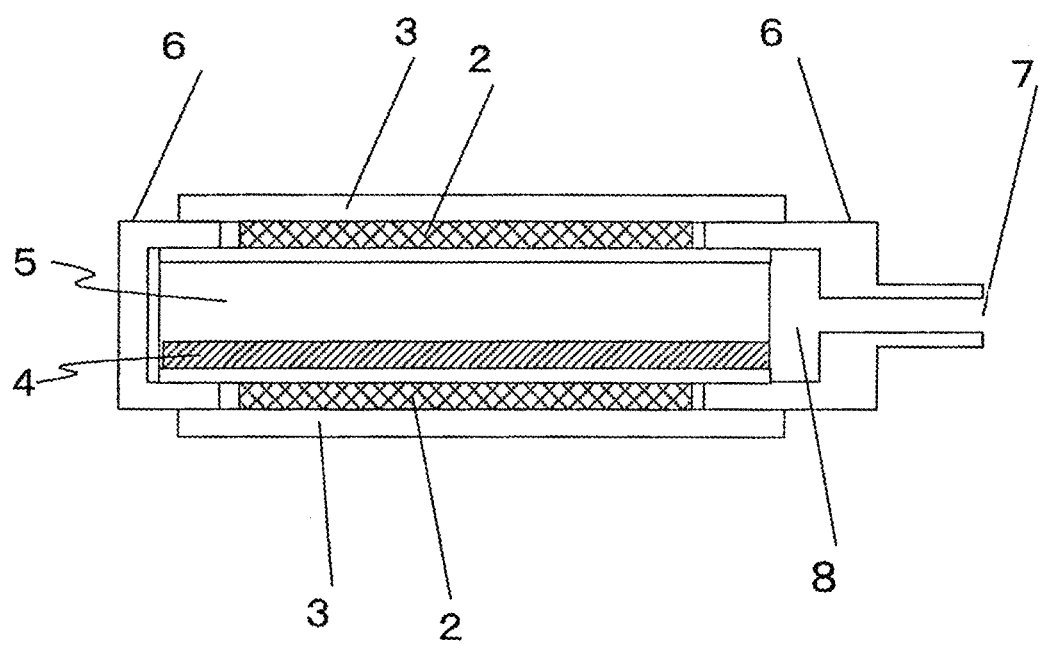
FIG. 10 is a cross-sectional view taken along line Y-Y in FIG. 8.

As shown in FIGS. 8 to 10, the resulting separation membranes 3 were bonded onto plastic nets which were provided on both surfaces of a frame having a filtered water outlet 7 at the top and having a length of 320 mm, a width of 220 mm, and a length of 5 mm to form an element. Using this element, a module shown in FIG. 11 was fabricated. The module was placed into a reservoir having an air nozzle 12 at the bottom and having a depth of 500 mm, a width of 150 mm, and a height of 700 mm as shown in FIG. 12. Activated sludge having a concentration of 3,000 mg/liter was placed in the reservoir and air was supplied from the air nozzle at a rate of 20 liter/min, while a permeation test was performed at a linear permeation rate of 0.4 m/day. A differential filtration pressure, which was converted to 25° C., was small, i.e., 0.5 kPa at an initial stage and 0.8 kPa at 1,000 hours later. No damage or detachment of the porous resin layer was observed after 1,000 hours.

Comparative Example 1

Figure 3:
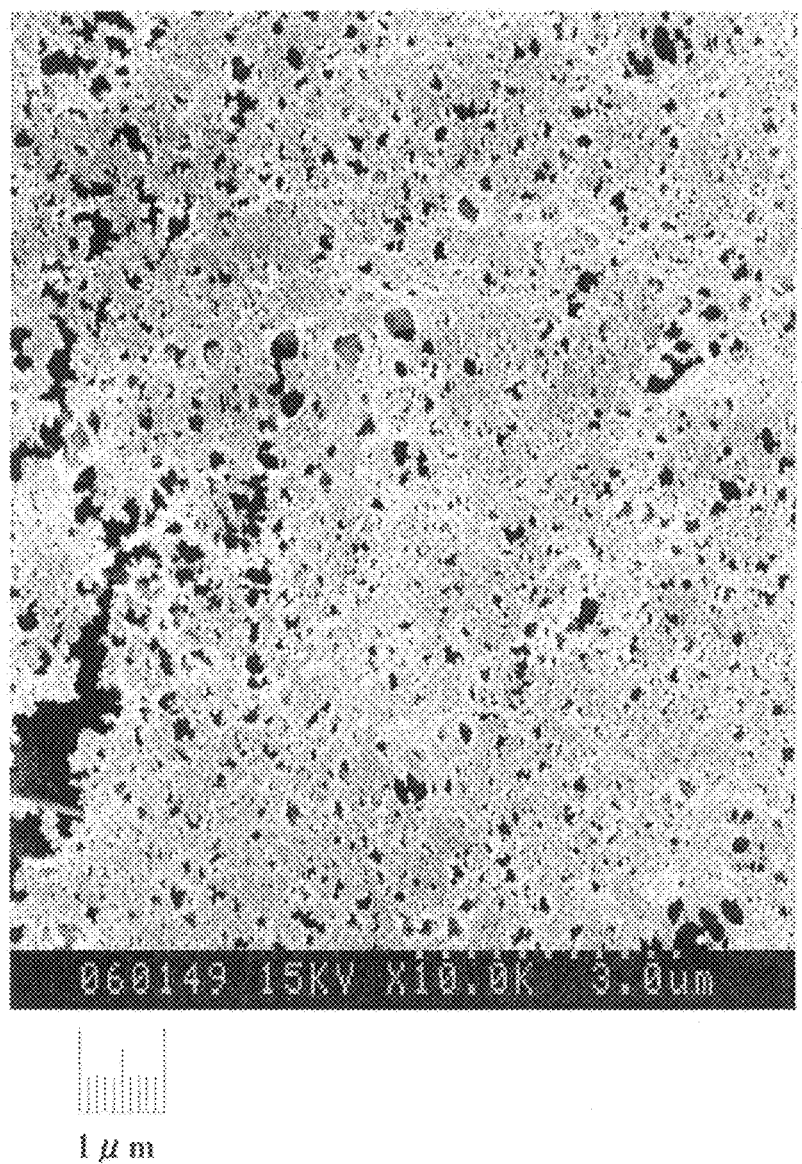
FIG. 3 is a scanning electron micrograph of a surface of a separation membrane according to COMPARATIVE EXAMPLE 1 of the present invention.
Figure 4:
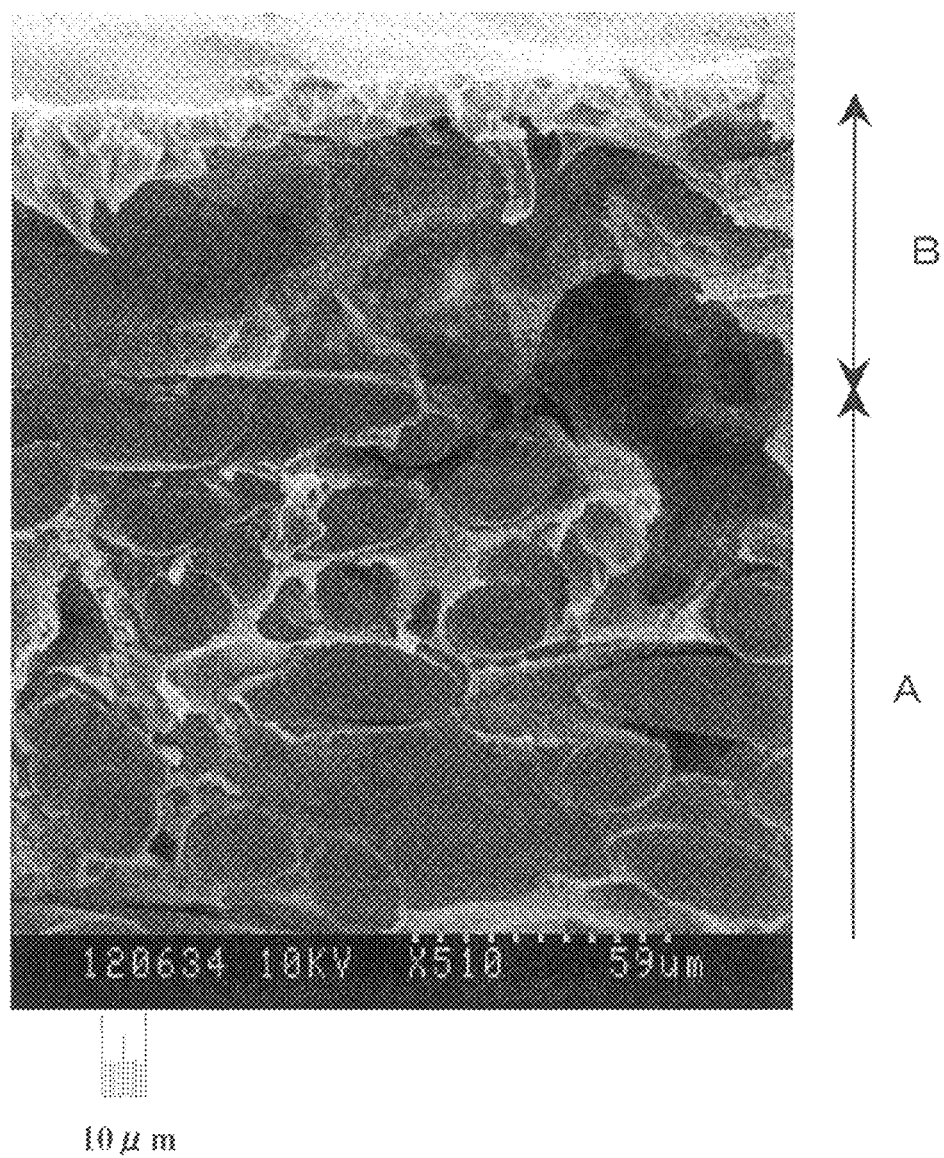
FIG. 4 is a scanning electron micrograph of a cross-section of the separation membrane according to COMPARATIVE EXAMPLE 1 of the present invention.

A separation membrane shown in FIGS. 3 and 4 was prepared as in EXAMPLE 1, but the solvent solution used had the following composition.

| | |
|---|---|
| PVDF: | 13.0 weight percent |
| PEG: | 5.5 weight percent |
| DMAc: | 81.5 weight percent |

The porous resin layer and the composite layer of the resulting separation membrane were observed in the scope of 9.2 μm by 10.4 μm by scanning electron microscopy at a magnification of ×10,000. The average of sizes of all observable micropores was 0.15 μm and the standard deviation thereof was 0.12 µm. Microcracks with a width of 1 to 2 µm occurred at some places. The cross-section perpendicular to the surface of the separation membrane was observed with the scanning electron microscope. Macrovoids having a short diameter of about 30 µm (about 0.14×A>0.05×A) were distributed in the porous resin layer and the composite layer. The thickness (C) of the composite layer was about 220 µm, which was substantially equal to the thickness of the porous substrate.

The measured rejection of the separation membrane for fine particles having an average diameter of 0.9 µm was 60%. The volume of permeating water measured as in EXAMPLE 1 was $39 \times 10^{-9}$ m$^3$/m$^2$·s·Pa.

A permeation test was performed as in EXAMPLE 1. A differential filtration pressure, which was converted to 25° C., was 0.5 kPa at an initial stage and was increased to 6 kPa at 1,000 hours later. No detachment of the porous resin layer was observed after 1,000 hours.

Comparative Example 2

Figure 5:
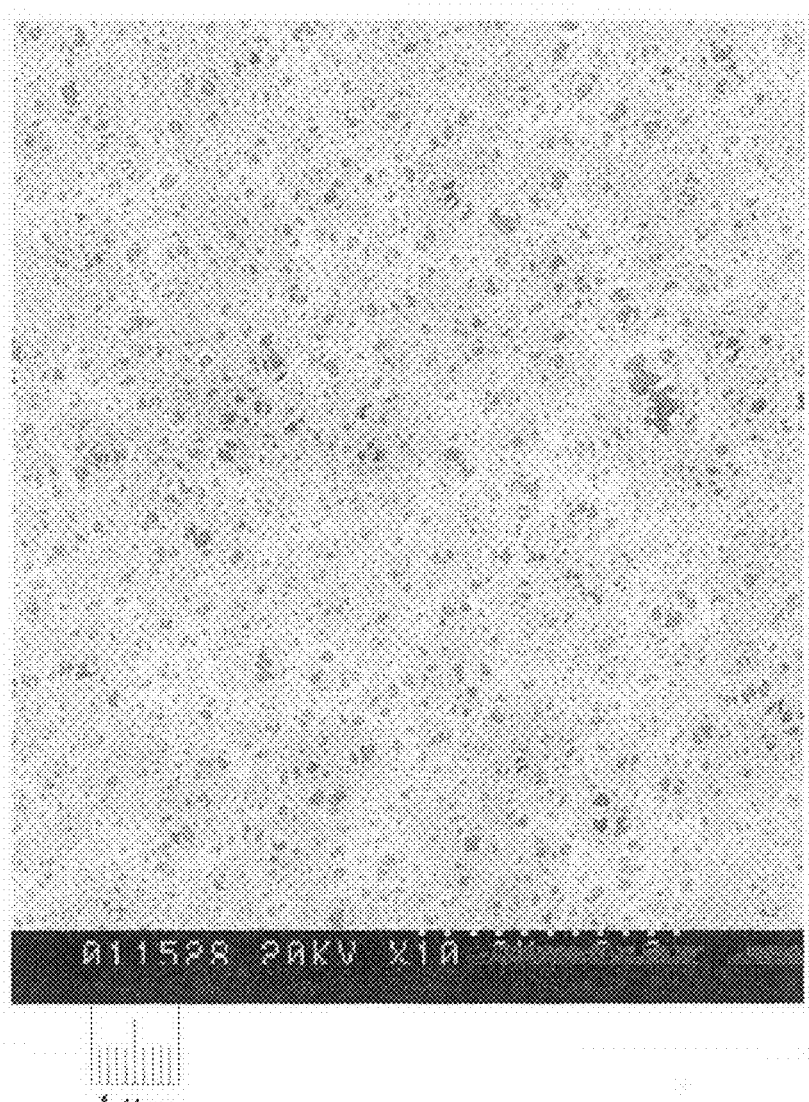
FIG. 5 is a scanning electron micrograph of a surface of a separation membrane according to EXAMPLE 2 of the present invention.
Figure 6:
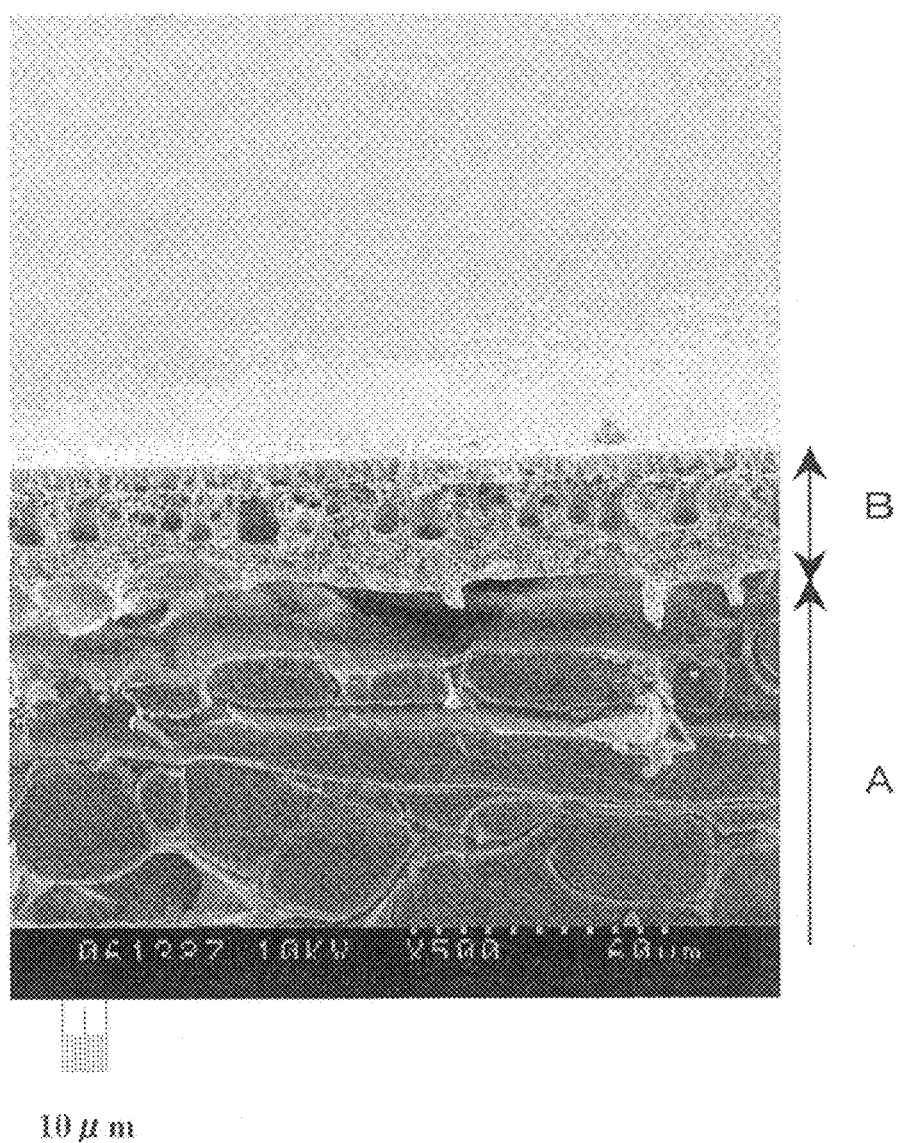
FIG. 6 is a scanning electron micrograph of a cross-section of the separation membrane according to EXAMPLE 2 of the present invention.
Figure 7:
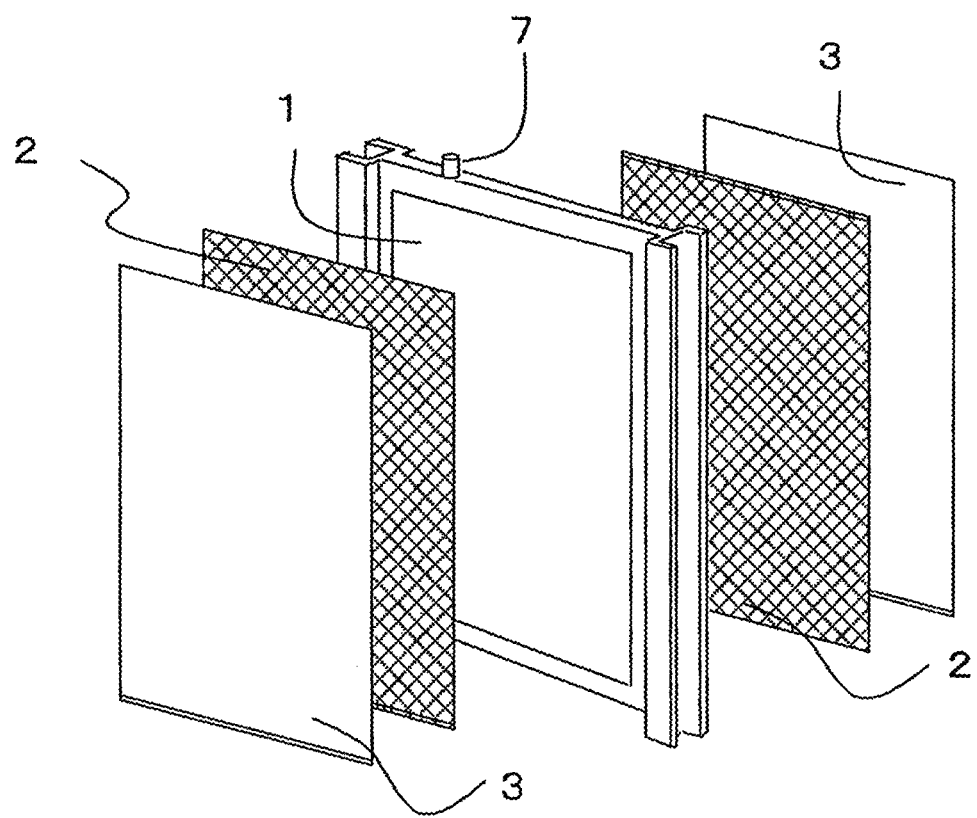
FIG. 7 is an exploded isometric view of an element including a separation membrane according to an embodiment of the present invention.

A separation membrane shown in FIGS. 5 and 6 was prepared as in EXAMPLE 1, but a polyester nonwoven fabric having a density of 0.90 g/cm$^3$ and a thickness (A) of 101 µm was used as the porous substrate.

The porous resin layer and the composite layer of the resulting separation membrane were observed in the scope of 9.2 µm by 10.4 µm by scanning electron microscopy at a magnification of ×10,000. The average of sizes of all observable micropores was 0.067 µm and the standard deviation thereof was 0.033 µm. The cross-section perpendicular to the surface of the separation membrane was observed with the scanning electron microscope. No macrovoids were observed. The thickness (B) of the porous resin layer was about 30 µm, but no composite layer (C) was observed. Thus, the porous resin layer was placed on the substrate. Accordingly, B was about 0.14×A, which is less than 0.2×A, and C/B was 0, which is less than 0.1.

The measured rejection of this separation membrane for fine particles having an average diameter of 0.9 µm was 98%. The volume of permeating water measured as in EXAMPLE 1 was $10 \times 10^{-9}$ m$^3$/m$^2$·s·Pa.

A permeation test was performed as in EXAMPLE 1. A differential filtration pressure, which was converted to 25° C., was 0.8 kPa at an initial stage. After 96 hours, the porous resin layer was detached from the porous substrate.

Comparative Example 3

A separation membrane was prepared as in EXAMPLE 1, but the polyester nonwoven fabric after applying the solvent solution was immersed in an aqueous 60-weight % DMAc solution for 5 minutes. The surface, away from the porous substrate, of the porous resin layer of the resulting separation membrane was observed in the scope of 9.2 µm by 10.4 µm by scanning electron microscopy at a magnification of ×10,000. The average of sizes of all observable micropores was 0.4 µm and the standard deviation thereof was 0.1 µm.

The measured rejection of this separation membrane for fine particles having an average diameter of 0.9 µm was 80%. The volume of permeating water measured as in EXAMPLE 1 was $40 \times 10^{-9}$ m$^3$/m$^2$·s·Pa.

Example 2

The solvent solution prepared in EXAMPLE 1 was cooled to 25° C. and was applied onto two surfaces of the polyester nonwoven fabric as in EXAMPLE 1. Immediately after, the polyester nonwoven fabric was immersed in pure water at 25° C. for 5 minutes, and was immersed in hot water at 80° C. three times to remove DMAc and PEG. A separation membrane was prepared in such a manner.

The cross-section perpendicular to the surface of the separation membrane was observed with a scanning electron microscope. The thickness (A) of the porous substrate was 220 µm, and the distances from the center of the porous substrate to the two surfaces of the porous resin layers were 150 µm and 130 µm. In other words, the thicker porous resin layer had a thickness of 40 µm and the thinner porous resin layer had a thickness of 20 µm, resulting in a total thickness (B) of 60 µm. The composite layer had a thickness (C) of about 220 µm, which was equal to the thickness of the porous substrate. Thus, B was about 0.27×A, which is larger than 0.2×A, and C/B was about 3.7, which is larger than 0.1.

The average pore size ($d_C$) in the center of the cross-section of the separation membrane was 0.4 µm and the standard deviation thereof was 0.1 µm. The average pore size ($d_A$) in the surface, away from the porous resin layer, of the porous substrate was 0.07 µm and the standard deviation thereof was 0.03 µm, whereas the average pore size ($d_B$) in the surface, near the porous resin layer, of the porous substrate was 0.07 µm and the standard deviation thereof was 0.03 µm. Herein, the average pore size and the standard deviation thereof were determined based on all micropores which can be observed within a scope of 9.2 µm by 10.4 µm by scanning electron microscopy at a magnification of ×10,000. Thus, $2d_A=0.14$, which is smaller than $d_C$, and $2d_B=0.14$, which is smaller than $d_C$.

The measured rejection of this separation membrane for fine particles having an average size of 0.9 µm was 99%. The volume of permeating water measured as in EXAMPLE 1 was $30 \times 10^{-9}$ m$^3$/m$^2$·s·Pa.

A permeation test was performed as in EXAMPLE 1. A differential filtration pressure, which was converted to 25° C., was 0.6 kPa at an initial stage and was 1.0 kPa at 1,000 hours later. No detachment of the porous resin layer was observed after 1,000 hours.

Comparative Example 4

The solvent solution prepared as in EXAMPLE 1 was cooled to 25° C. and was applied onto two surfaces of the same polyester nonwoven fabric as in EXAMPLE 1. Immediately after, the polyester nonwoven fabric was immersed in an aqueous 60-weight % DMAc solution at 25° C. for 5 minutes, and was immersed in hot water at 80° C. three times to remove DMAc and PEG. A separation membrane was prepared in such a manner.

The cross-section perpendicular to the surface of the separation membrane was observed with a scanning electron microscope. The thickness (A) of the porous substrate was 220 µm, and the distances from the center of the porous substrate to the two surfaces of the porous resin layers were 150 µm and 130 µm. In other words, the thicker porous resin layer had a thickness of 40 µm and the thinner porous resin layer had a thickness of 20 µm, resulting in a total thickness (B) of 60 µm. The composite layer had a thickness (C) of about 220 µm, which was equal to the thickness of the porous substrate. Thus, B was about 0.27×A, which is larger than 0.2×A, and C/B was about 3.7, which is larger than 0.1.

The average pore size ($d_C$) in the center of the cross-section of the porous resin layer was 0.6 µm. The average pore size ($d_A$) in the surface, away from the porous resin layer, of the porous substrate was 0.4 µm, whereas the average pore size ($d_B$) in the surface, near the porous resin layer, of the porous substrate was 0.4 μm. Herein, the average pore size was determined based on all micropores which can be observed within a scope of 9.2 μm by 10.4 μm by scanning electron microscopy at a magnification of ×10,000. Thus, $2d_A$=0.8, which is larger than $d_C$, and $2d_B$=0.8, which is larger than $d_C$.

The measured rejection of this separation membrane for fine particles having an average diameter of 0.9 μm was 80%. The volume of permeating water measured as in EXAMPLE 1 was $40\times10^{-9}$ m$^3$/m$^2$·s·Pa.

As described above, the separation membrane according to the present invention has a high rejection and high permeability and does not clog. Furthermore, the separation membrane can be readily produced by a method for making a separation membrane according to the present invention.

What is claimed is:

1. A method of sewage treatment comprising:
   immersing a separation membrane module into wastewater which includes activated sludge and is contained in a reservoir, wherein the separation membrane module comprises a plurality of separation membrane elements, and a housing containing the separation membrane elements, wherein each separation membrane element comprises a supporting plate, a separation membrane and a filtered water outlet and wherein the separation membrane is a flat membrane and is arranged on at least one face of the supporting plate;
   separating the wastewater into filtered water and suspended solids by having the water wastewater permeate through the separation membrane; and
   having the filtered water flow toward the exterior from the filtered water outlet;
   wherein the flat separation membrane of each separation membrane element comprises a nonwoven fabric and a porous resin layer on at least one surface of the nonwoven fabric;
   the porous resin layer comprises a resin;
   a part of the resin permeates into the nonwoven fabric to form a composite layer with the nonwoven fabric;
   the porous resin layer has at its surface, pores having an average pore size in the range of 0.01 to 0.2 μm and a standard variation of pore sizes of 0.1 μm or less; and
   the nonwoven fabric has a thickness A of from 50 μm to 1 mm, the porous resin layer has a thickness B and the composite layer has a thickness C; and wherein the separation membrane satisfies:

$B \geq 0.2 \times A$, and $C/B \geq 0.1$; and macrovoids are present in the porous resin layer and have larger diameters than the diameter of pores at the surface and have a short diameter of $0.05 \times A$ or more;
   and supplying air from an air diffuser to the surfaces of the separation membranes of the separation membrane elements.

2. The method according to claim 1, wherein the nonwoven fabric has a density of 0.7 g/cm$^3$ or less.

3. The method according to claim 1, wherein the porous resin layer is a porous resin layer consisting essentially of polyvinylidene fluoride.

4. The method according to claim 1, wherein a rejection of microparticles having an average particle size of 0.9 μm is at least 90%.

5. The method according to claim 1, wherein the separation membrane elements are arranged substantially parallel to each other so as to form spaces between the adjacent separation membranes.

6. The method according to claim 1, wherein the nonwoven fabric consists of fibers selected from the group consisting of cellulose fibers, cellulose triacetate fibers, polyester fibers, polypropylene fibers and polyethylene fibers, and the porous resin layer consists of a resin selected from the group consisting of polyvinyl chloride resins, polysulfone resins and polyethersulfone resins.

* * * * *